US011189049B1

(12) United States Patent
Chakravarty et al.

(10) Patent No.: US 11,189,049 B1
(45) Date of Patent: Nov. 30, 2021

(54) VEHICLE NEURAL NETWORK PERCEPTION AND LOCALIZATION

(71) Applicant: Ford Global Technologies, LLC, Dearborn, MI (US)

(72) Inventors: Punarjay Chakravarty, Campbell, CA (US); Shubham Shrivastava, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/072,334

(22) Filed: Oct. 16, 2020

(51) Int. Cl.
   *G06K 9/00* (2006.01)
   *G06T 7/73* (2017.01)

(52) U.S. Cl.
   CPC ............ *G06T 7/73* (2017.01); *G06K 9/00201* (2013.01); *G06K 9/00791* (2013.01);
   (Continued)

(58) Field of Classification Search
   CPC ............ G06T 7/73; G06T 2207/10028; G06T 2207/20084; G06T 2207/20081;
   (Continued)

(56) References Cited

U.S. PATENT DOCUMENTS 10,529,089 B2   1/2020   Ahmad et al.
10,671,860 B2   6/2020   Liu et al.
(Continued)

FOREIGN PATENT DOCUMENTS

WO   2020132233 A1   6/2020

*Primary Examiner* — Carol Wang
(74) *Attorney, Agent, or Firm* — Bejin Bieneman PLC; Frank A. MacKenzie

(57) ABSTRACT

A computer, including a processor and a memory, the memory including instructions to be executed by the processor to determine a plurality of topological nodes wherein each topological node includes a location in real-world coordinates and a three-dimensional point cloud image of the environment at the location of the topological node and process an image acquired by a sensor included in a vehicle using a variational auto-encoder neural network trained to output a semantic point cloud image, wherein the semantic point cloud image includes regions labeled by region type and region distance relative to the vehicle. The instructions include further instructions to determine a topological node closest to the vehicle and a six degree-of-freedom pose for the vehicle relative to the topological node closest to the vehicle based on the semantic point cloud data, determine a real-world six degree-of-freedom pose for the vehicle by combining the six degree-of-freedom for the vehicle relative to the topological node and the location in real-world coordinates of the topological node closest to the vehicle and determine a location and size of a three-dimensional object in the semantic point cloud image based on three-dimensional background subtraction using the three-dimensional point cloud image included in the topological node closest to the vehicle. The instructions include further instructions to improve the three-dimensional point cloud image included in the topological node based on the semantic point cloud image and the real-world six degree-of-freedom pose for the vehicle.

20 Claims, 10 Drawing Sheets

(52) U.S. Cl.
CPC ............... *G06T 2207/10012* (2013.01); *G06T 2207/10028* (2013.01); *G06T 2207/20081* (2013.01); *G06T 2207/20084* (2013.01); *G06T 2207/30252* (2013.01)

(58) Field of Classification Search
CPC ........... G06T 2207/30252; G06T 2207/10012; G06K 9/00791; G06K 9/00201
See application file for complete search history.

(56) References Cited

U.S. PATENT DOCUMENTS

| | | | |
|---|---|---|---|
| 2019/0096086 A1* | 3/2019 | Xu | G06T 7/60 |
| 2019/0217476 A1* | 7/2019 | Jiang | B25J 13/08 |
| 2020/0029490 A1 | 1/2020 | Bertucci et al. | |
| 2020/0098135 A1 | 3/2020 | Ganjineh et al. | |
| 2021/0048312 A1* | 2/2021 | Choi | G01S 19/14 |
| 2021/0286068 A1* | 9/2021 | Kumar | G01S 13/867 |

\* cited by examiner

VEHICLE NEURAL NETWORK PERCEPTION AND LOCALIZATION

BACKGROUND

Vehicles can be equipped with computing devices, networks, sensors, and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

A computing device in a traffic infrastructure system can be programmed to acquire data regarding the external environment of a vehicle and to use the data to determine a vehicle path upon which to operate a vehicle in an autonomous or semi-autonomous mode. A vehicle can operate on a roadway based on a vehicle path by determining commands to direct the vehicle's powertrain, braking, and steering components to operate the vehicle to travel along the path. The data regarding the external environment can include the location of one or more objects such as vehicles and pedestrians, etc., in an environment around a vehicle and can be used by a computing device in the vehicle to operate the vehicle.

Determining a vehicle path can include solving two problems: perception and localization. Perception includes determining locations of objects in an environment around a vehicle. Objects can include other vehicles, pedestrians, traffic barriers, etc. Localization includes determining a six degree-of-freedom (DoF) pose for the vehicle with respect to a map of the environment around the vehicle. A six DoF pose includes a location in three orthogonal coordinates (x, y, and z, for example) and orientation in three rotations about the axes of each of the three orthogonal coordinates (roll, pitch, and yaw, for example). Localizing a vehicle with respect to a map and perceiving objects in an environment around a vehicle can permit a computing device in a vehicle to determine a vehicle path upon which the vehicle can travel to reach a destination on the map while avoiding contact with objects in the environment around the vehicle. A vehicle path can be a polynomial function determined to maintain lateral and longitudinal accelerations of the vehicle within upper and lower limits as it travels on the vehicle path.

Figure 2:
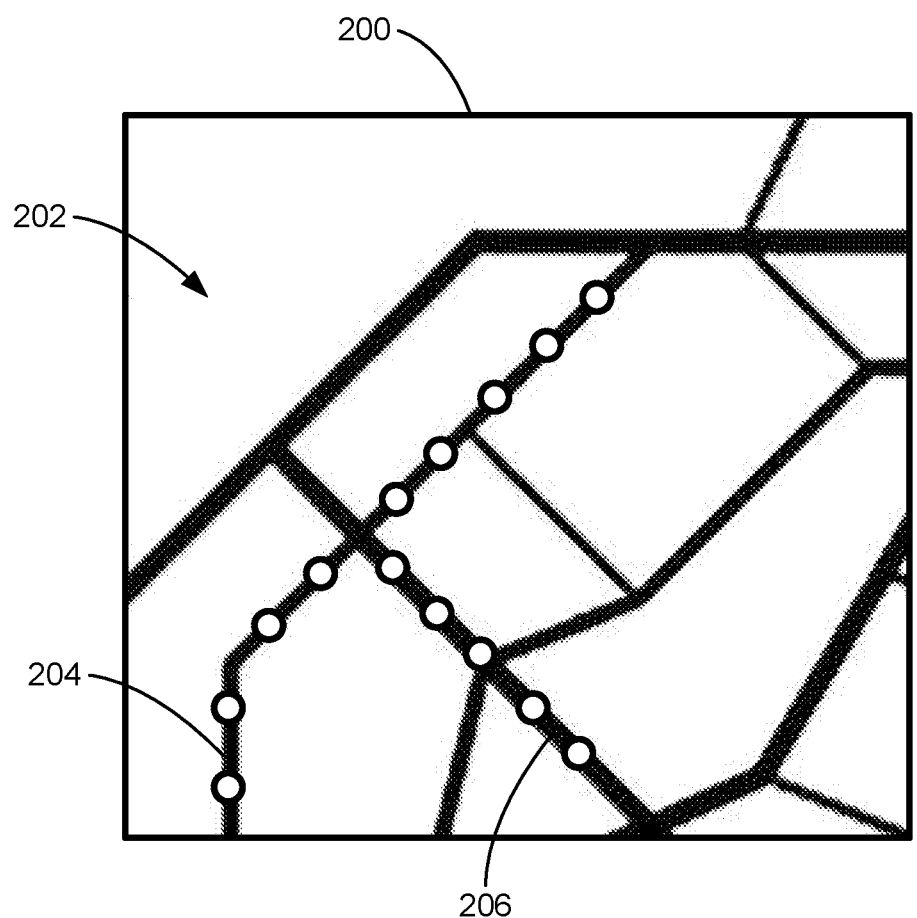
FIG. 2 is a diagram of an example illustration of a topoplogical map.

Solving localization and perception problems for vehicle routing can begin by recognizing that vehicles typically travel repeatedly along the same routes. Techniques disclosed herein can take advantage of predictable travel patterns by creating a topological map of repeatedly traveled routes that can be used by a vehicle to solve localization and perception problems using less expensive equipment and fewer computer resources that would otherwise be required to determine a vehicle route. Techniques described herein perform perception and localization of an environment around a vehicle by first determining a topological map of a route to be traveled by the vehicle. A route is defined as a path that describes successive locations of a vehicle as it travels from one point to a second point on a map, typically on roadways. The topological map is a map that includes location and image data that can be used by a computing device in a vehicle to determine data including vehicle location and locations of objects in an environment around the vehicle. A topological map is generated by processing a plurality of stereo images of the route to form a plurality of nodes as illustrated in FIG. 2. Each node includes six DoF data for a location along a route and 3D image data that includes three-dimensional (3D) features based on an RGB image from a stereo image pair. The features are extracted from the RGB images using machine vision techniques and 3D data extracted from stereo image data as will be discussed below in relation to FIGS. 3-5. The six DoF data and the 3D image data is used to train a neural network to input a color or reg, green, blue (RGB) image acquired by a sensor included in a vehicle and output data identifying the closest node of the topological map and a labeled point cloud image as will be discussed in relation to FIGS. 6-8. A point cloud image is point cloud data that includes distances or range to points in the image. A semantic point cloud is a point cloud image includes labels that identify regions within the image corresponding to objects. Regions so labeled can include roadways, sidewalks, vehicles, pedestrians, buildings and foliage, etc. Techniques disclosed herein improve localization and perception by determining a six DoF location of a vehicle and identifying objects in an environment around a vehicle based on a single monocular image, thereby eliminating the expense and computational resources required by stereo cameras or lidar sensors. Techniques described herein also discuss updating the topological map with new data acquired by vehicles traversing the route, thereby improving the data included at each node of the topological map to reflect any changes to the route.

Disclosed herein is a method, including inputting an image acquired by a sensor in a vehicle to a variational auto-encoder neural network that outputs a semantic point cloud image that includes regions labeled by region type and region distance relative to the vehicle and, from a plurality of topological nodes, determining a topological node closest to the vehicle and a six degree-of-freedom pose for the vehicle relative to the topological node closest to the vehicle based on the semantic point cloud image, wherein each topological node includes a location in real-world coordinates and a three-dimensional point cloud image of an environment including the location of the topological node. A real-world six degree-of-freedom pose for the vehicle can be determined by combining the six degree-of-freedom pose for the vehicle relative to the topological node and the location in real-world coordinates of the topological node closest to the vehicle and a location and size of a three-dimensional object in the semantic point cloud image can be determined based on three-dimensional background subtraction using the three-dimensional point cloud image included in the topological node closest to the vehicle. The real-world six degree-of-freedom pose for the vehicle can be determined based on a single monocular image acquired by the sensor in the vehicle without including an inertial measurement unit in the vehicle.

The semantic point cloud image can be determined based on a single monocular image acquired by the sensor in the vehicle without including a stereo camera or lidar sensor in the vehicle. The topological nodes can be determined by acquiring point cloud images with a stereo camera and determining locations of the point cloud images in real-world coordinates with visual odometry. The real-world six degree-of-freedom pose for the vehicle can be determined in coordinates based on orthogonal x, y, and z axes and roll, pitch, and yaw rotations about the x, y, and z axes, respectively. The location and size of an object in semantic point cloud data can be determined with a convolutional neural network trained to determine a three-dimensional bounding box that includes the three-dimensional object and a real-world location relative to the vehicle for the object. Three-dimensional background subtraction using the point cloud image can be used to determine the three-dimensional bounding box by reducing background clutter caused by labeled regions that occur in both a current semantic point cloud and a semantic point cloud image included in a topological node. The convolutional neural network can include convolutional layers that output first latent variables to first fully connected neural network layers. The variational auto-encoder neural network can determine the semantic point cloud image by outputting second latent variables to second fully connected neural network layers. The variational auto-encoder neural network can be trained to output the semantic point cloud image in a Siamese network configuration wherein the variational auto-encoder neural network is trained in parallel with a second variational auto-encoder network trained using a plurality of three-dimensional point cloud images acquired while traveling along a route that includes the plurality of topological nodes. The semantic point cloud image region types can include roadway, sidewalk, vehicle, building, and foliage based on the plurality of three-dimensional point cloud images. The variational autoencoder neural network can include an encoder, a decoder and a loss function. The variational autoencoder neural network encoder processes input image data to form latent variables. The variational autoencoder neural network decoder can be trained to determine six degree of freedom data from the latent variables.

Further disclosed is a computer readable medium, storing program instructions for executing some or all of the above method steps. Further disclosed is a computer programmed for executing some or all of the above method steps, including a computer apparatus, programmed to input an image acquired by a sensor in a vehicle to a variational auto-encoder neural network that outputs a semantic point cloud image that includes regions labeled by region type and region distance relative to the vehicle and, from a plurality of topological nodes, determine a topological node closest to the vehicle and a six degree-of-freedom pose for the vehicle relative to the topological node closest to the vehicle based on the semantic point cloud image, wherein each topological node includes a location in real-world coordinates and a three-dimensional point cloud image of an environment including the location of the topological node. A real-world six degree-of-freedom pose for the vehicle can be determined by combining the six degree-of-freedom pose for the vehicle relative to the topological node and the location in real-world coordinates of the topological node closest to the vehicle and a location and size of a three-dimensional object in the semantic point cloud image can be determined based on three-dimensional background subtraction using the three-dimensional point cloud image included in the topological node closest to the vehicle. The real-world six degree-of-freedom pose for the vehicle can be determined based on a single monocular image acquired by the sensor in the vehicle without including an inertial measurement unit in the vehicle.

The computer can be further programmed to determined the semantic point cloud image based on a single monocular image acquired by the sensor in the vehicle without including a stereo camera or lidar sensor in the vehicle. The topological nodes can be determined by acquiring point cloud images with a stereo camera and determining locations of the point cloud images in real-world coordinates with visual odometry. The real-world six degree-of-freedom pose for the vehicle can be determined in coordinates based on orthogonal x, y, and z axes and roll, pitch, and yaw rotations about the x, y, and z axes, respectively. The location and size of an object in semantic point cloud data can be determined with a convolutional neural network trained to determine a three-dimensional bounding box that includes the three-dimensional object and a real-world location relative to the vehicle for the object. Three-dimensional background subtraction using the point cloud image can be used to determine the three-dimensional bounding box by reducing background clutter caused by labeled regions that occur in both a current semantic point cloud and a semantic point cloud image included in a topological node. The convolutional neural network can include convolutional layers that output first latent variables to first fully connected neural network layers. The variational auto-encoder neural network can determine the semantic point cloud image by outputting second latent variables to second fully connected neural network layers. The variational auto-encoder neural network can be trained to output the semantic point cloud image in a Siamese network configuration wherein the variational auto-encoder neural network is trained in parallel with a second variational auto-encoder network trained using a plurality of three-dimensional point cloud images acquired while traveling along a route that includes the plurality of topological nodes. The semantic point cloud image region types can include roadway, sidewalk, vehicle, building, and foliage based on the plurality of three-dimensional point cloud images. The variational autoencoder neural network can include an encoder, a decoder and a loss function. The variational autoencoder neural network encoder processes input image data to form latent variables. The variational autoencoder neural network decoder can be trained to determine six degree of freedom data from the latent variables.

Figure 1:
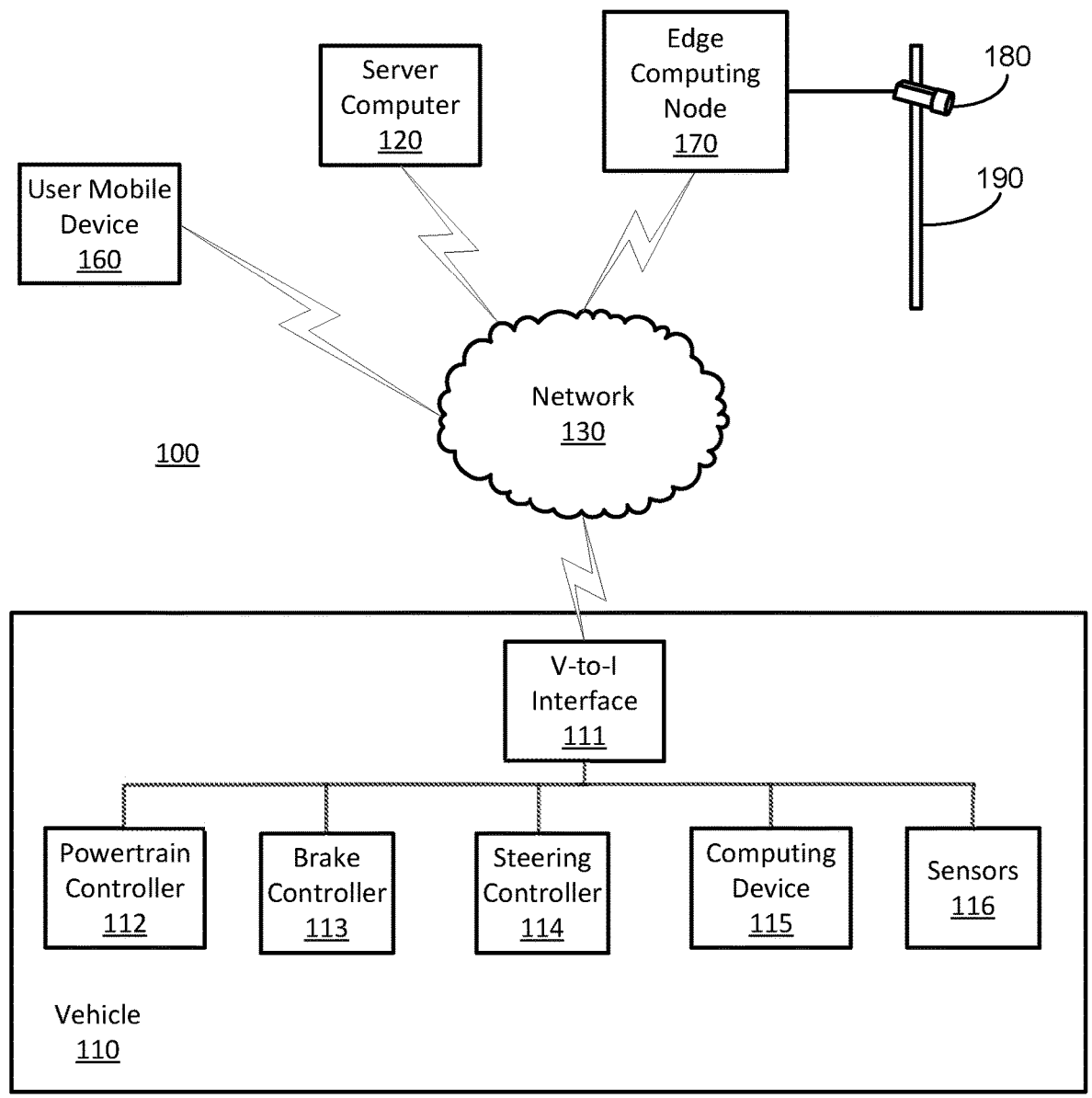
FIG. 1 is a diagram of an example traffic infrastructure system.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include conventional electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115, and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Traffic infrastructure system 100 can include one or more edge computing nodes 170. Edge computing nodes 170 are computing devices as described above that can be located near roadways, and can be in communication with stationary or moveable sensors. For example, a stationary video camera 180 can be attached to a pole 190, building, or other structure to give the video camera 180 a view of traffic. Mobile sensors can be mounted on drones or other mobile platforms to provide views of traffic from positions not available to stationary sensors. Edge computing nodes 170 further can be in communication with computing devices 115 in vehicle 110, server computers 120, and user mobile devices 160 such as smart phones. Server computers 120 can be cloud-based computer resources that can be called upon by edge computing nodes 170 to provide additional computing resources when needed.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

FIG. 2 is a diagram of a topological map 200. Topological map 200 can be constructed by acquiring and processing stereo video data using video odometry to determine topological nodes 202 along a route or roadway 204, 206. A topological map 200 is a set of nodes 202, each of which includes real world coordinate data regarding the location of the node and three dimensional (3D) image data derived from the stereo video data as discussed in relation to FIGS. 3-6, below. A topological map 200 can be illustrated as in FIG. 2 by modifying a street map by adding nodes 202, illustrated as circles on roadways or routes 204, 206. The terms roadways and routes will be used interchangeably herein. Each node 202 is located on a roadway 204, 206 that can be traveled along by a vehicle 110. Nodes are located with one to 10 meters distance between adjacent nodes. Spacing out nodes in this fashion permits location of a vehicle 110 within a few centimeters, for example one to 25 centimeters, in x, y, and z directions while maintaining a limit on the amount of data required to represent the route. The roadway 204, 206 is mapped using a vehicle equipped with a stereo camera to generate stereo point cloud data and RGB images corresponding to the stereo point cloud data. Each node 202 in the topological map includes a representative RGB image with corresponding features derived from latent variables from a neural network to be described in relation to FIGS. 7 and 8. Each node also includes 2D image points extracted from the RGB image using machine vision techniques described in relation to FIGS. 3-6 and corresponding 3D locations derived from stereo point cloud data.

Figure 3:
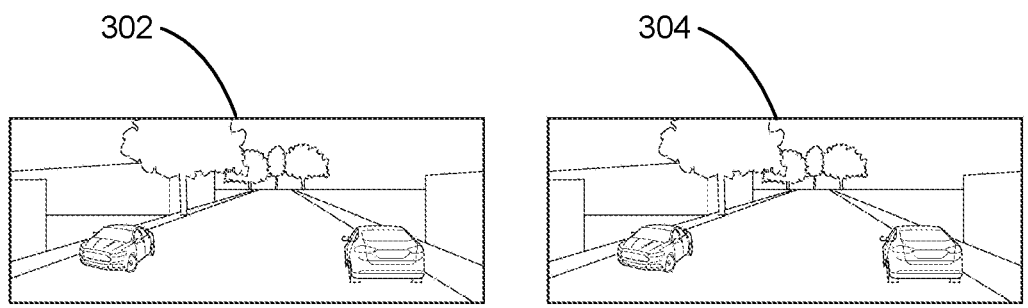
FIG. 3 is a diagram of example stereo images.

FIG. 3 is a diagram of a pair of stereo images 302, 304. Stereo images can be acquired by a stereo camera, where two cameras are arranged to view the same scene with a lateral separation. The lateral separation, also referred to as the baseline, causes the cameras to generate images where corresponding points in each image will be displaced with respect to the image by an amount that is a function of the lateral separation of the cameras and the distance of the point in space from the camera. Because the lateral separation of the cameras can be precisely determined, a simple geometric transformation can yield distances to points in the images, e.g., as described further below.

Figure 4:
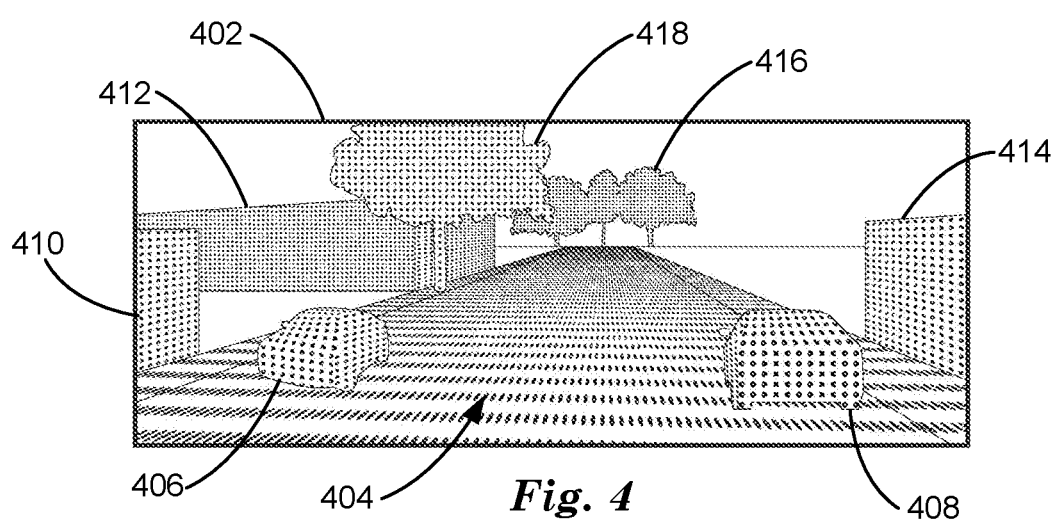
FIG. 4 is a diagram of an example point cloud image.

FIG. 4. is a diagram of a stereo point cloud image 402 generated from a pair of stereo images 302, 304. While the pixels values in a pair of stereo images 302, 304 correspond to the amount of light received by the sensors, in a stereo point cloud image 402 the value of the pixels correspond to distances from the point corresponding to the pixel to the sensor. A stereo point cloud image 402 can be constructed from a pair of stereo images 302, 304 based on stereo disparity. Stereo disparity is defined as the difference in corresponding feature point locations in a pair of stereo images 302, 304. Corresponding feature points are defined as locations in the pair of stereo images 302, 304 that share similar pixel values including regions around the locations. For example, corners, edges and textures in the pair of stereo images 302, 304 can be corresponding feature points. The feature points can be determined by known machine vision techniques which determine feature points by processing regions in images to find pixel locations that can be defined by patterns of abrupt changes in pixel values, for example edges and corners and textures. Patterns of pixel values around feature points can be compared between pairs of stereo images to identify corresponding feature points that occur in both images. The difference in location with respect to the array of image points can be used to measure stereo disparity. An example of feature point detection can be found in SURF (US Patent Application 2009238460, Ryuji Funayama, Et. Al., ROBUST INTEREST POINT DETECTOR AND DESCRIPTOR, published 2009 Sep. 24).

Once corresponding feature points in a pair of stereo images 302, 304 by determining similar arrangements of pixel values. Because the distance between the stereo cameras determined by the fixed mount to which the cameras are attached, a baseline is established that permits the distance from the sensors to corresponding feature points to be determined by triangulation. An equation for determining the distance from an image sensor to a point $P=x_p, y_p, z_p$ in overlapping fields of view of a pair of stereo image sensors corresponding to image feature locations $P(u_1, v_1), P(u_2, v_2)$ in first and second stereo image based on stereo disparity is given by the equations:

$$d = u_1 - u_2 \qquad (1)$$

$$x_p = \frac{bu_1}{d}, y_p = \frac{bv_1}{d}, z_p = \frac{bf}{d} \qquad (2)$$

Where d is the disparity determined by a difference in feature coordinates locations $u_1 - u_2$ in the x-direction, b is the baseline between the centers of first and second image sensors and f is the common focal distance of the image sensors. Distances to a plurality of corresponding feature points determined in this fashion can be assembled into a point cloud image.

A stereo point cloud image can also be determined by training a convolutional neural network (CNN) to determine a point cloud image 402 from a pair of stereo images 302, 304. A convolutional neural network includes a plurality of convolutional layers followed by a plurality of fully connected layers. The convolutional layers can determine the feature points, which are passed as latent variables to the fully connected layers, which calculate the equivalent of equations (1) and (2). A CNN can be trained to determine a point cloud image 402 from a pair of stereo images 302, 304 using a training dataset that includes pairs of stereo images 302, 304 along with ground truth point cloud images 402 that have been determined using feature points and geometric processing based on equations (1) and (2). Ground truth is data corresponding to a correct result output from a CNN, i.e., data correctly representing a real-world state, where the ground truth data is acquired from a source independent from the CNN. Ground truth is used to compare to the result output from a CNN when training the CNN to determine when the CNN is outputting a correct result. For example, ground truth for point cloud data can be determined by manually selecting corresponding features in a pair of stereo images and manually calculating distances based on measured baseline and camera focal length to form ground truth point cloud data.

In addition to distances, the pixels of the stereo point cloud image 402 can be labeled according to the objects they correspond to. One or more of the RGB images included in the stereo image pairs 302, 304 can be input to a convolutional neural network (CNN) that has been trained to segment images. Image segmentation is a machine vision technique that labels objects in image data. The CNN can label objects in an input image and then the labels can be transferred to point cloud data. In stereo point cloud image 402, objects corresponding to a roadway, vehicles, trees and buildings adjacent to the roadway have been labeled to identify the regions of pixels in the stereo point cloud image 402 corresponding to the labeled objects. The CNN can be trained by labeling a plurality of RGB images manually to create ground truth images. The RGB images can be labeled by humans using image processing software to label regions of the images that correspond to objects as defined above.

Figure 5:
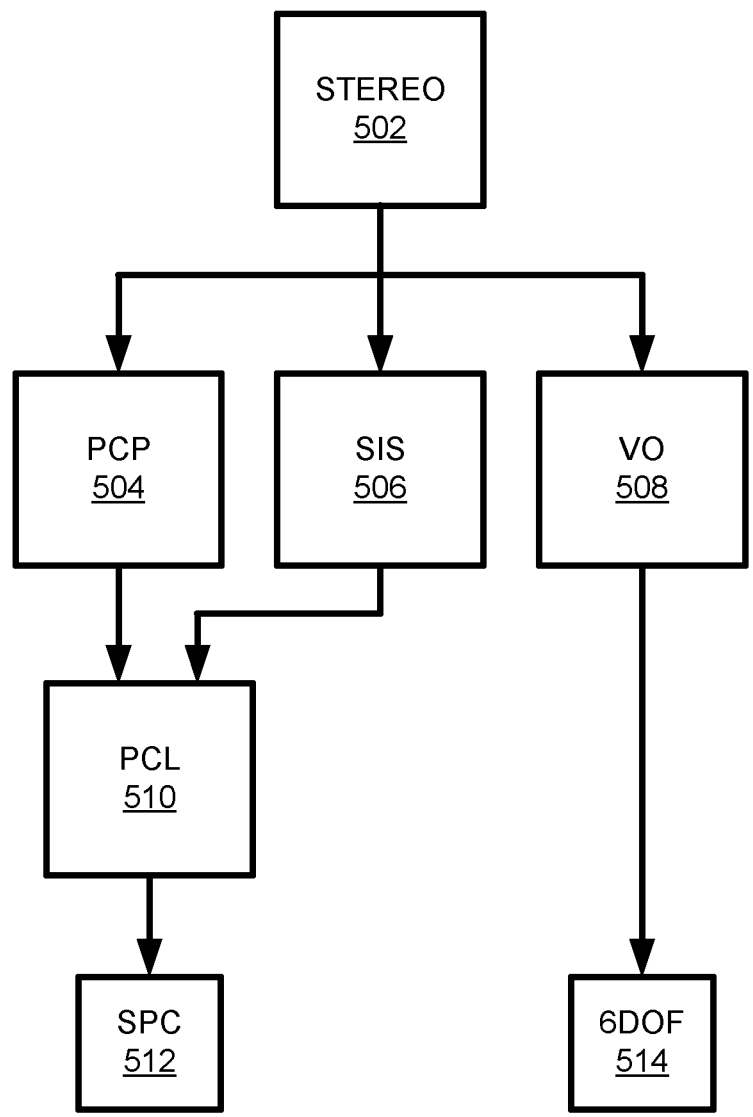
FIG. 5 is an example node system that generates topological nodes.

Point cloud image 402 has been processed using the node system 500 described in relation to FIG. 5 to form a semantic point cloud 512 where objects and regions are labeled. For example, point cloud image includes labeled regions corresponding to a roadways, sidewalks, vehicles, pedestrians, buildings, foliage, etc.

FIG. 5 is a diagram of a node system 500 that generates node 202 data from pairs of stereo images (STEREO) 502 acquired as a mapping vehicle equipped with stereo video sensors travels along a roadway 204, 206 to be mapped. Node system 500 can be implemented as software operating on a computing device 115, for example. Pairs of stereo images 502 are acquired by a vehicle as the vehicle travels along a route 204, 206 and input to node system 500. The pairs of stereo images 502 are processed by point cloud processor (PCP) 504 to form a point cloud image by determining three dimensional locations of corresponding feature points by determining stereo disparity between the pairs of stereo images 502. Point cloud processor can be a CNN as discussed above in relation to FIG. 4, above.

The pairs of stereo images 502 are also passed to an image segmentation processor (SIS) 506. Image segmentation processor 506 segments one or both RGB images in the pair of stereo images 502 to generate a one or more segmented RGB images using a CNN as discussed above in relation to FIG. 4. The pairs of stereo images 502 are processed one at a time as RGB images (RGB) 504 by segmentation processor (SIS) 506. Segmentation processor is a CNN trained to label regions in RGB image 504 data. A CNN can be trained to label regions in RGB image 504 data by first constructing a training dataset, where images are labeled manually by humans using image processing software to draw boundaries around objects and filling in the boundaries with pixel values corresponding to the objects. The manually labeled images are ground truth to be compared with the output of the CNN. The dataset can include more than 1000 RGB images 504 with corresponding ground truth. The CNN is executed a plurality of times with the same RGB image 504 as input while changing sets of parameters that govern the operation of the convolutional layers and fully connected layer included in the CNN. The sets of parameters are graded depending upon how similar the output is to the corresponding ground truth. The highest scoring sets of parameters over the training dataset are retained as the set of parameters to use when operating the trained CNN.

The one or more segmented RGB images are passed to point cloud labeling (PCL) 510 where a point cloud image from point cloud processor 504 is combined with segmented RGB images formed from the same stereo pair that generated the point cloud image to form a semantic point cloud 512. A semantic point cloud 504 is a point cloud image where the point cloud data corresponding to distances is also labeled to identify the type of object or region. For example, in point cloud image 402 a roadway 404, vehicles 406, 408, buildings 410, 412, 414 and foliage 416, 418 have been labeled, making point cloud image 402 a semantic point cloud 514.

A plurality of pairs of stereo images 502 are input to a visual odometry processor (VO) 508. Stereo visual odometry is a technique for determining a six DoF (6DOF) pose 514 for a vehicle 110 based on determining changes in the locations of features extracted from the images as the vehicle 110 moves through a scene. Visual odometry can be performed by a trained variational autoencoder (VAE). A VAE is a neural network that includes an encoder, a decoder and a loss function. A VAE can be trained to input image data, encode the image data to form latent variables that correspond to an ecoded representation of the input image data and decode the latent variables to output an image that includes portions of the input image data modified in a deterministic fashion. The VAE can be trained by determining a loss function which measures how accurately the VAE has encoded and decoded the image data. Once a VAE is trained, the encoder portion, or "head" can be removed from the VAE and used to form latent variables that correspond to the input images. The latent variables formed by the encoder can be processed by decoding sections that derive additional types of data, for example six DoF data that describes the pose of the camera that acquired the input image as discussed below.

Visual odometry is a known technique for determining six DoF data from a sequential series of images. Visual odometery can be determined by training a VAE to input stereo pairs of images and outputting six DoF data. The VAE determines corresponding feature points in sequential images and calculates the change in location of the sensor between images. A six DoF pose for the camera can be determined by triangulating two or more sets of feature points to determine translation and rotation to determine a frame of reference for the sensor in global coordinates. The VAE can be trained by determining ground truth using an inertial measurement unit (IMU) and real time kinematic-enhanced global positioning systems (GPS-RTK).

A VAE includes an encoder, a decoder and a loss function. The encoder inputs image data and encodes the input image data into latent variables. The latent variables are then decoded to form a six DoF pose for the vehicle based on the input image data. The loss function is used to train the encoder and decoder by determining whether the six DoF poses 514 are valid poses for a vehicle on a roadway based on training the encoder and decoder using ground truth data regarding six DoF poses 514 corresponding to the input images determined based on real-world measurements of a vehicle six DoF poses 514. Visual odometry processor 508 determines six DoF poses 514 based on a plurality of pairs of stereo images 502 acquired as the mapping vehicle travels along the path to be topologically mapped. The six DoF pose 514 locates the vehicle with respect to global coordinates.

When the mapping vehicle has progressed along the roadway 204, 206 a specified distance from the previous node 202, which can be two to 10 meters, for example, the computing device 115 can create a new node 202 place in into the topological map. Each node 202 in the topological map includes a semantic point cloud 512, one or more RGB images from the pair of stereo images 502 and a six DoF pose corresponding to the location of the node 202 on the topological map.

Figure 6:
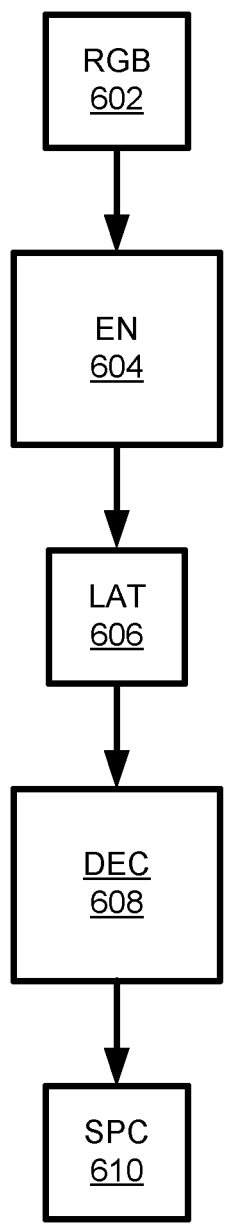
FIG. 6 is an example of a topological convolutional neural network.

FIG. 6 is a diagram of a topological CNN 600. A topological CNN 600 is a type of VAE. A topological CNN 600 is a neural network that can be trained to input an RGB image (RGB) 602 and output a semantic point cloud (SPC) 610. The topological CNN 600 can be trained using the RGB images from the pairs of stereo images 502 and input and semantic point clouds 512. The VAE includes an encoder (EN) 604 which includes convolutional layers that encode the input RGB image 602 into latent variables (LAT) 606 and a decoder (DEC) 608, that uses full-connected layers to decode the latent variables 606 into a semantic point cloud 626. The encoder 604 or "head" can be detached from the rest of the VAE and used as the input processing portion of two additional neural networks, six DoF localization system 700 neural networks and 3D object detection system 800 neural networks, as discussed further below.

Figure 7:
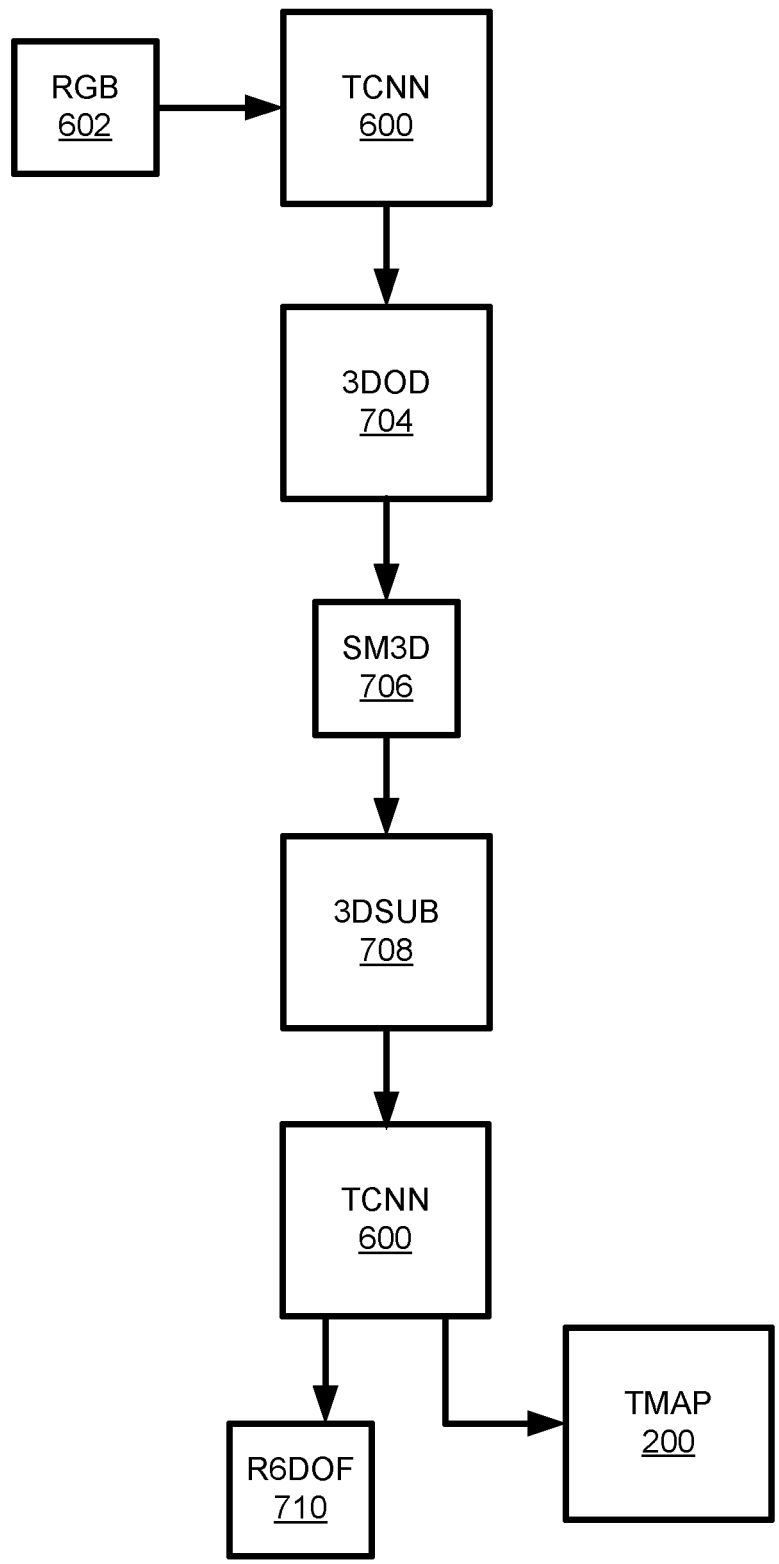
FIG. 7 is an example of a six degree of freedom localization system.

FIG. 7 is a diagram of a six DoF localization system 700. Six DoF localization system 700 determines a six DoF pose for a vehicle 110. Six DoF localization system 700 includes two topological CNNs 600 and a 3D object detection system 704. Six DoF localization system 700 takes as input the output of a topological CNN 600. Topological CNN 600 inputs an RGB image 602 and outputs a semantic point cloud corresponding to the RGB image 602. The topological CNN 600 can also be trained to output a six DoF pose corresponding to the location of the vehicle 110 that acquired the RGB image 602. Six DoF localization system 700 can improve the estimate of the six DoF pose of the vehicle 110 by combining 3D object detection and six DoF localization. A 3D object detector 704 can be used to remove 3D objects from semantic point cloud data where the 3D objects correspond to dynamic obstacles such as other vehicles, pedestrians and traffic barriers, for example. This can improve determining six DoF data for localization of a vehicle 110 because the presence of these dynamic obstacles which were not present during topological mapping of the scene can obscure the signature of the scene and thereby cause errors in determining the six DoF pose of the vehicle based on processing by topological CNN 600.

Six DoF localization system 700 determines an estimate of a six DoF pose for a vehicle by first inputting an RGB image 602 acquired by a vehicle 110 traveling on a roadway 204, 206 included in a topological map 200 to the encoder topological CNN 600 of FIG. 6. In response to the RGB image 602, the topological CNN 600 outputs a semantic point cloud 610 to 3D object detector (3DOD) 704. The 3D object detector 704 is a VAE trained to detect objects in a semantic point cloud 610 by first determining bounding boxes for each object in a semantic point cloud 610 and then filtering the bounding boxes to determine objects that occur on or adjacent to a roadway. The VAE can be trained using semantic point cloud data as ground truth. Point cloud data from stereo cameras or lidar sensors can be manually labeled by human operators. The human operators can also determine bounding boxes for the labeled objects. The ground truth including labeled bounding boxes can be compared to the output from the VAE to train the VAE to correctly label point cloud data.

The 3D object detector 704 outputs a semantic point cloud (SM3D) 706 with 3D objects corresponding to vehicles, pedestrians, traffic barriers, etc. marked in the semantic point cloud data by bounding boxes, where a bounding box is a rectangular 3D wire frame shape parallel to the detected roadway in the point cloud data. The semantic point cloud 706 including bounding boxes for detected 3D objects is passed to 3D subtraction (3DSUB) 708 where the detected 3D objects are subtracted from the point cloud data by subtracting all of the pixels within the bounding boxes from the semantic point cloud 708. The semantic point cloud 708 with the 3D objects subtracted is passed to the topological CNN 600 for processing. The topological CNN 600 again processes the semantic point cloud 708 with 3D objects removed to obtain a refined six DoF pose (R6DOF) 710 for the vehicle 110 along with the node number of the closest topological node 202. The topological CNN 600 can also output a refined semantic point cloud and a topological node number to be returned to the topological map to refine the semantic point cloud data included at the node number indicated by the output by the topological CNN 600.

Six DoF localization system 700 improves vehicle localization by processing a semantic point cloud with 3D objects removed to improve the estimate of the six DoF pose for the vehicle 110. Six DoF localization system 700 also improves the topological map 200 by updating the semantic point cloud data included in the topological map 200 at a particular node to include changes that may have occurred in the scene since the first semantic point cloud was acquired and input to the topological map. Six DoF localization system 700 outputs node number corresponding to the closest topological node 202 included in the topological map 200. Six DoF localization system 700 also outputs a refined six DoF pose 710 determined relative to the closest node 202. The vehicle can determine a six DoF pose in real-world coordinates for the vehicle using the equation:

$$P_o^v = P_o^n \cdot P_n^v \qquad (3)$$

Where $P_o^v$ is the six DoF pose of the vehicle in real-world coordinates measured with respect to the origin of the topological map, obtained from the, $P_o^n$ is the six DoF pose of the closest node 202 measured with respect to the topological map origin, and $P_n^v$ is the six DoF pose 710 of the vehicle 110 measured with respect to the closest topological node 202.

Figure 8:
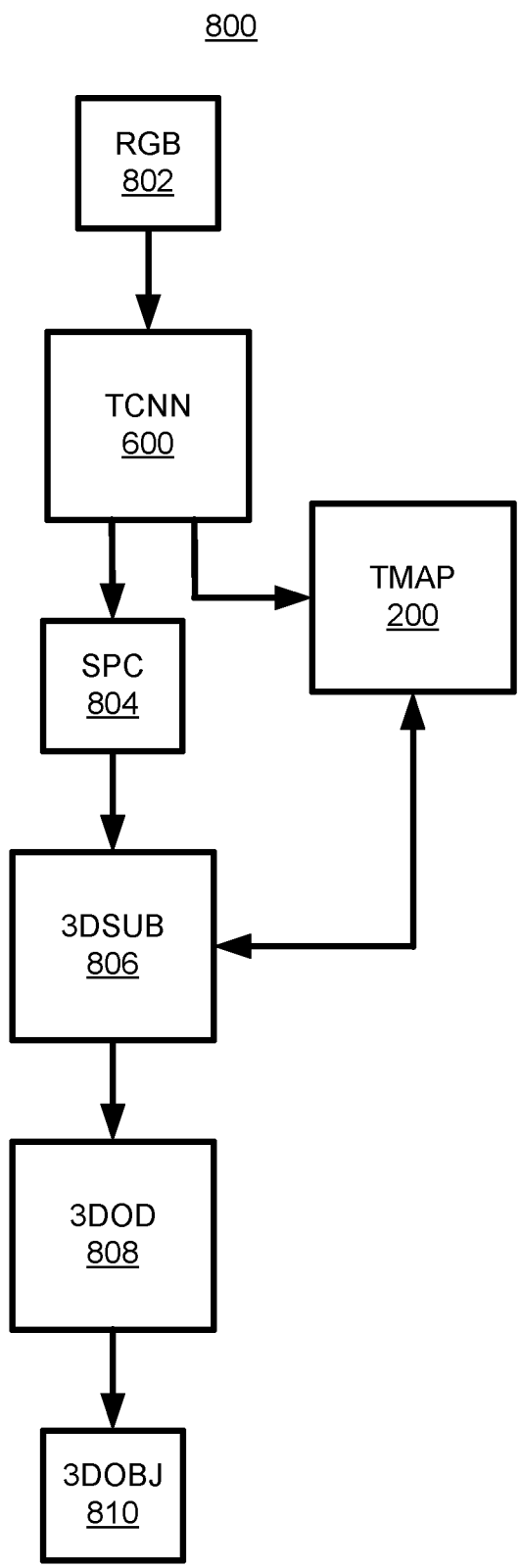
FIG. 8 is an example of a three dimensional object detection system.

FIG. 8 is a diagram of 3D object detection system 800. Six DoF localization of a vehicle as determined by six DoF system 700 and 3D object detection are complementary tasks. 3D object detection system 800 can improve six DoF localization as discussed above in relation to FIG. 6, and six DoF localization can improve 3D object detection system 800. Six DoF localization system 700 determines the location of a vehicle with respect to the topological map 200 allows the subtraction of the current semantic point cloud based on an RGB image acquired by the vehicle from the semantic point cloud in the topological map 200. This can be done with 3D background subtraction. Subtraction of the semantic point clouds can be used as a guide to the location of the dynamic objects in the scene which were not present during mapping. The 3D bounding box detection network can then be focused on these regions of the scene, which can speed up the algorithm up considerably by reducing background clutter caused by labeled 3D regions in the semantic point cloud not related to 3D objects of interest such as buildings and foliage.

In 3D object detection, an RGB image acquired by a vehicle 110 is input to topological CNN 600 to produce a semantic point cloud 804. Topological CNN 600 also identifies a topological node number that gets passed to the topological map 200. In response to the input topological node number, topological map (TMAP) 200 outputs the stored semantic point cloud to 3D subtraction (3DSUB) where it is subtracted from the semantic point cloud 804 produced in response to the input RGB image 802 from vehicle 110 sensors. Subtracting the stored semantic point cloud from the topological map 200 from the current semantic point cloud 804 yields a point cloud image with the approximate position of the 3D objects indicated by non-zero data points, i.e., regions where the current point cloud 804 differs from the stored semantic point cloud. These regions are passed to a 3D object detector (3DOD) 808 where the regions output by 3D subtraction are used to guide the 3D object detector 808, thereby speeding up the 3D object detector 808 and reducing the required computing resources required for 3D object detection. The 3D object detector is described in relation to FIG. 8, above. The 3D object detector 808 outputs locations and labels that identify the 3D objects (3DOBJ) 810 in the semantic point cloud 804 to permit a computing device 115 in the vehicle 110 to determine a vehicle path that avoids the 3D objects 810.

Figure 9:
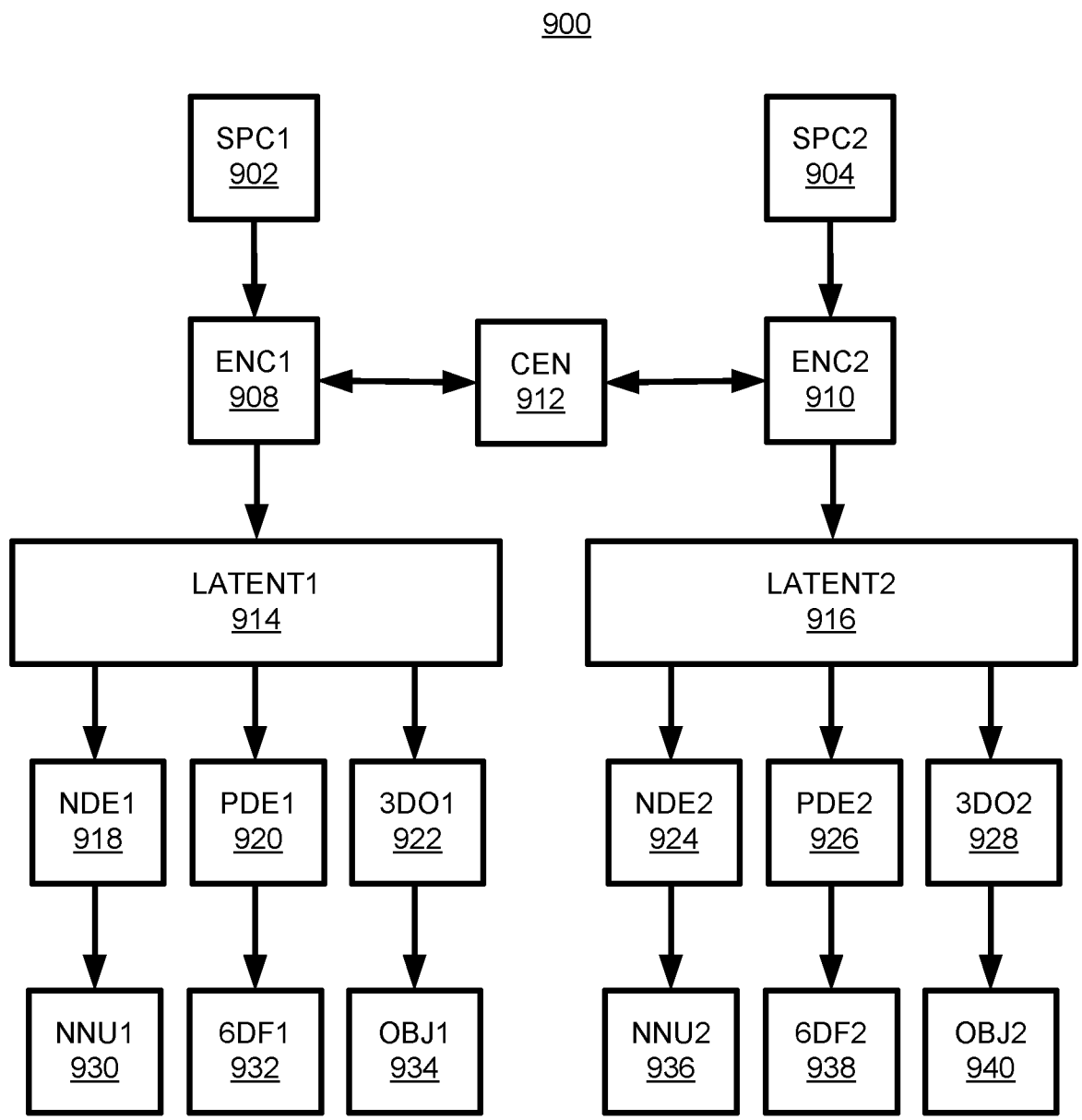
FIG. 9 is an example of a Siamese network.

FIG. 9 is a diagram of a Siamese network 900 that can be used to train localization networks and 3D object detection networks simultaneously. The duality of object detection and localization can be used to improve both processes in addition to the techniques discussed in relation to FIGS. 7 and 8. Multiple traversals of the route can be used to train a Siamese network 900. A Siamese network 900 is a neural network configured to share some encoder layers between two neural networks. One branch of the Siamese network 900 inputs the semantic point cloud (SPC1) 902 from the topological node when the route is traversed without dynamic obstacles. The other branch of the Siamese network 900 inputs the semantic point cloud (SPC1) 904 when there are dynamic obstacles. These pairs of semantic point clouds 902, 904 from each topological node 202, with and without dynamic objects are used to train the Siamese network 900, both to determine vehicle six DoF localization as discussed in relation to FIGS. 7 and 3D object pose detection as discussed in relation to FIG. 8. As discussed in relation to FIG. 6, a VAE with encoder-decoder architecture to recreate semantic point clouds can be pre-trained and its encoder (ENCODE) 908 can be detached and used as the heads of the Siamese network 900.

Siamese network 900 includes two encoders (ENC1, ENC2) 908, 910 that input semantic point cloud data 902, 904, respectively. The encoders 908, 910 share convolutional layers (CEN) 912 included in each encoder 908, 910. Having shared convolutional layers 912 means that the parameters determined for the shared convolutional layers 912 during training will be the same for each encoder 908, 910. Shared convolutional layers 912 permit encoders 908, 910 to share ground truth data when training the neural networks, thereby improving the training of each encoder 908, 910 by effectively increasing the number of training images and corresponding ground truth data to the total number of sematic point clouds 902, 904. Encoders 908, 910 output latent variables (LATENT1, LATENT2) 914, 916. The latent variables 914, 916 are input to node number decoding layers (NDE1, NDE2) 918, 924, pose decoding layers (PDE1, PDE2) 920, 926, and 3D object decoding layers (3DO1, 3DO2) 922, 928, respectively. Node number decoding layers 918, 924 input latent variables 914, 916 and output the node number (NNU1, NNU2) 930, 936 of the node 202 closest to the input semantic point cloud 902, 904, respectively as discussed in relation to FIG. 6, above. Pose decoding layers 920, 926 input latent variables 914, 916 and output six DoF poses (6DF1, 6DF2) 932, 938 for the vehicle that acquired the semantic point cloud 902, 904 with respect to the node 202 identified by the node number 930, 936 as discussed in relation to FIG. 6, above. 3D object decoding layers 922, 928 input latent variables 914, 916 and output 3D bounding boxes and labels for objects in the semantic point clouds 902, 904 as discussed above in relation to FIG. 7.

Techniques described herein improve determining vehicle six DoF locations and 3D object detection by permitting vehicle six DoF vehicle locations and 3D object detection to be performed using a monocular RGB camera on routes that have been previously mapped to form a topological map 200. Using a monocular RGB camera to perform 3D object detection is far less expensive and requires fewer computing resources than using stereo cameras or lidar sensors. Techniques described herein can determine six DoF vehicle locations much less expensively and using fewer computing resources than using an inertial measurement unit (IMU) or real time kinematic-enhanced global positioning systems (GPS-RTK). Techniques described herein can also improve the topological map 200 corresponding to a route by updating the node data corresponding to the nodes 202 of the topological map 200 based on the node numbers 622, six DoF pose 624, and semantic point clouds 626 determined based on input RGB images 602 acquired as the vehicle 110 traverses a give route.10

Figure 10:
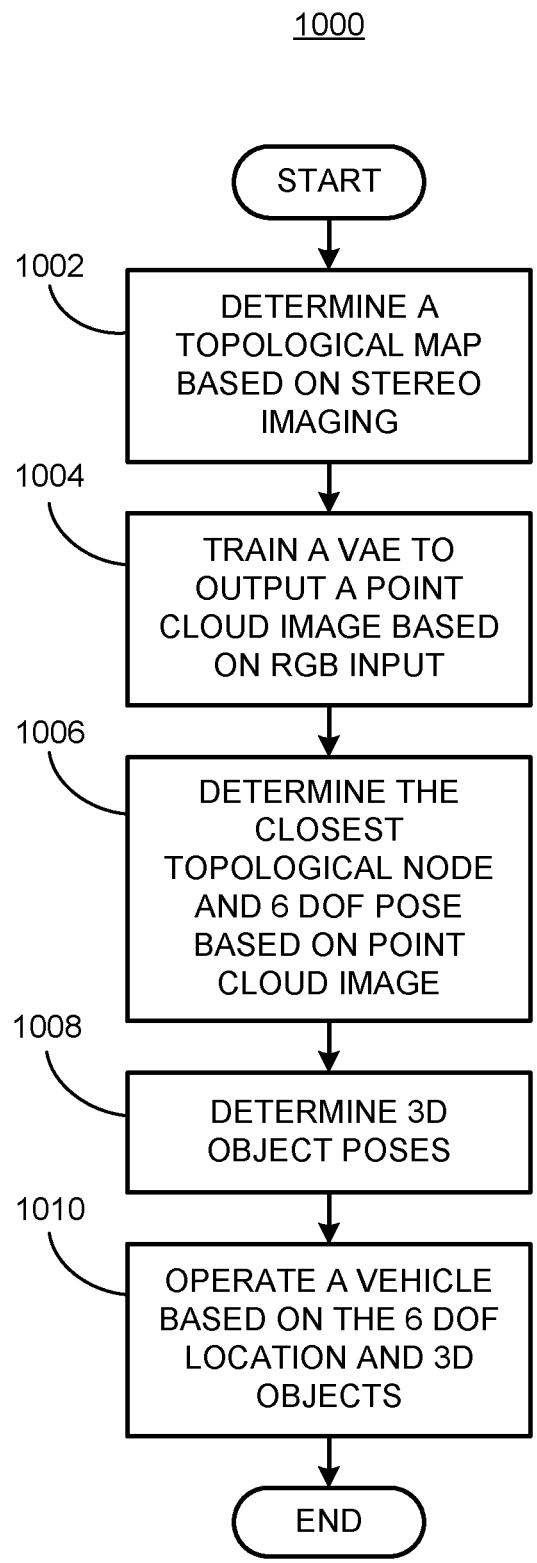
FIG. 10 is a flowchart diagram of an example process to operate a vehicle based on six degree of freedom localization and three dimensional object detection.

FIG. 10 is a diagram of a flowchart, described in relation to FIGS. 1-9, of a process 1000 for determining vehicle six DoF pose and 3D object detection from RGB images. Process 1000 can be implemented by a processor of computing device, taking as input information from sensors, and executing commands, and outputting object information, for example. Process 1000 includes multiple blocks that can be executed in the illustrated order. Process 1000 could alternatively or additionally include fewer blocks or can include the blocks executed in different orders.

Process 1000 begins at block 1002, where a topological map 202 is determined for a roadway by traversing the roadway with a mobile platform equipped with a stereo camera as discussed in relation to FIG. 2. The stereo images are processed by a computing device 115 to produce a semantic point cloud, where distance to points in the image are grouped and labeled as discussed in relation to FIG. 5. For example, a semantic point cloud can include labels for roadways, vehicles, pedestrians, buildings and foliage. The topological map 200 includes a plurality of nodes 202, where each node includes a six DoF location and a semantic point cloud. The technique is described herein using ground vehicles operating on roads, however, the techniques can be used to determine a route for any mobile platform, including mobile robots, drones or boats, for example.

At block 1004 a computing device 115 trains a topological CNN 600 to input a monocular RGB image and output a semantic point cloud as discussed in relation to FIG. 6. The topological CNN 600 can also be trained to output a six DoF pose for the vehicle 110 that acquired the RGB image and a topological node number corresponding to the closest topological node 202 from the topological map 200. The closest topological node is defined as the topological node with a six DoF location that has the least Euclidian distance in three dimensions from the six DoF location of the vehicle as determined by six DoF localization system 700.

At block 1006 the computing device 115 uses the trained topological CNN to determine a six DoF pose for the vehicle and the node number of the closest topological node 202 in the topological map 200. As discussed above in relation to FIG. 7, the computing device 115 can detect and label 3D objects in a semantic point cloud output by the topological CNN to remove them from the semantic point cloud and thereby determine a refined six DoF pose for the vehicle 110. The data determined by the computing device 115 at block 1006 can be passed back to the topological map 200 to update the topological map 200.

At block 1008 the computing device 115 can determine 3D object locations in the point cloud data determined by the topological CNN 600. A semantic point cloud from the topological map 200 can be used to determine an approximate location for the 3D objects in the semantic point cloud output by the topological CNN 600 which can be used to increase the efficiency of 3D object detection system 800. The locations of 3D objects determined at block 1008 can be passed back to the topological map 200 to update the semantic point cloud included in the closest topological node 202.

At block 1010 the computing device 115 can use the six DoF pose of the vehicle 110 with respect to the topological map 200 output by six DoF localization system 700 and the locations of 3D objects detected by 3D object detection system 800 to operate the vehicle. Computing device 115 can determine a vehicle path upon which to operate the vehicle 110 by sending commands to vehicle brake, steering and powertrain controllers. The vehicle path can be a polynomial function determined to stay within the roadway and avoid 3D objects. The vehicle path can be determined based on maintaining lower and upper limits on lateral and longitudinal accelerations. Following block 1010 process 1000 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, *Julia*, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
a processor; and
a memory, the memory including instructions executable by the processor to:
input an image acquired by a sensor in a vehicle to a variational auto-encoder neural network that outputs a semantic point cloud image that includes regions labeled by region type and region distance relative to the vehicle;

from a plurality of topological nodes, determine a topological node closest to the vehicle, and a six degree-of-freedom pose for the vehicle relative to the topological node closest to the vehicle, based on the semantic point cloud image, wherein each topological node includes a location in real-world coordinates and a three-dimensional point cloud image of an environment including the location of the topological node;

determine a real-world six degree-of-freedom pose for the vehicle by combining the six degree-of-freedom pose for the vehicle relative to the topological node closest to the vehicle and the location in real-world coordinates of the topological node closest to the vehicle; and determine a location and size of a three-dimensional object in the semantic point cloud image based on three-dimensional background subtraction using the three-dimensional point cloud image included in the topological node closest to the vehicle.

2. The computer of claim 1, the instructions including further instructions to determine the real-world six degree-of-freedom pose for the vehicle based on a single monocular image acquired by the sensor in the vehicle without including an inertial measurement unit in the vehicle.

3. The computer of claim 1, the instructions including further instructions to determine the semantic point cloud image based on a single monocular image acquired by the sensor in the vehicle without including a stereo camera or lidar sensor in the vehicle.

4. The computer of claim 1, the instructions including further instructions to determine the plurality of topological nodes by acquiring point cloud images with a stereo camera and determining locations of the point cloud images in real-world coordinates with visual odometry.

5. The computer of claim 1, wherein the real-world six degree-of-freedom pose for the vehicle is determined in coordinates based on orthogonal x, y, and z axes and roll, pitch, and yaw rotations about the x, y, and z axes, respectively.

6. The computer of claim 1, the instructions including further instructions to determine the location and size of the three-dimensional object in the semantic point cloud image with a convolutional neural network trained to determine a three-dimensional bounding box that includes the three-dimensional object and a real-world location relative to the vehicle for the three-dimensional object.

7. The computer of claim 6, wherein three-dimensional background subtraction using the point cloud image is used to determine the three-dimensional bounding box by reducing background clutter caused by labeled regions that occur in both a current semantic point cloud and a semantic point cloud image included in a topological node.

8. The computer of claim 7, wherein the convolutional neural network includes convolutional layers that output first latent variables to first fully connected neural network layers.

9. The computer of claim 1, wherein the variational auto-encoder neural network determines the semantic point cloud image by outputting second latent variables to second fully connected neural network layers.

10. The computer of claim 1, the instructions including further instructions to train the variational auto-encoder neural network to output the semantic point cloud image in a Siamese network configuration wherein the variational auto-encoder neural network is trained in parallel with a second variational auto-encoder network trained using a plurality of three-dimensional point cloud images acquired while traveling along a route that includes the plurality of topological nodes.

11. The computer of claim 10, wherein region types included in the semantic point cloud image include roadway, sidewalk, vehicle, building, and foliage based on the plurality of three-dimensional point cloud images.

12. A method, comprising:
inputting an image acquired by a sensor in a vehicle to a variational auto-encoder neural network that outputs a semantic point cloud image that includes regions labeled by region type and region distance relative to the vehicle;

from a plurality of topological nodes, determining a topological node closest to the vehicle, and a six degree-of-freedom pose for the vehicle relative to the topological node closest to the vehicle, based on the semantic point cloud image, wherein each topological node includes a location in real-world coordinates and a three-dimensional point cloud image of an environment including the location of the topological node;

determining a real-world six degree-of-freedom pose for the vehicle by combining the six degree-of-freedom pose for the vehicle relative to the topological node closest to the vehicle and the location in real-world coordinates of the topological node closest to the vehicle; and determine a location and size of a three-dimensional object in the semantic point cloud image based on three-dimensional background subtraction using the three-dimensional point cloud image included in the topological node closest to the vehicle.

13. The method of claim 12, further comprising determining the real-world six degree-of-freedom pose for the vehicle based on a single monocular image acquired by the sensor in the vehicle without including an inertial measurement unit in the vehicle.

14. The method of claim 12, further comprising determining the semantic point cloud image based on a single monocular image acquired by the sensor in the vehicle without including a stereo camera or lidar sensor in the vehicle.

15. The method of claim 12, further comprising determining the plurality of topological nodes by acquiring point cloud images with a stereo camera and determining locations of the point cloud images in real-world coordinates with visual odometry.

16. The method of claim 12, wherein the real-world six degree-of-freedom pose for the vehicle is determined in coordinates based on orthogonal x, y, and z axes and roll, pitch, and yaw rotations about the x, y, and z axes, respectively.

17. The method of claim 12, the instructions including further instructions to determine the location and size of the three-dimensional object in the semantic point cloud image with a convolutional neural network trained to determine a three-dimensional bounding box that includes the three-dimensional object and a real-world location relative to the vehicle for the three-dimensional object.

18. The method of claim 17, wherein three-dimensional background subtraction using the point cloud image is used to determine the three-dimensional bounding box by reducing background clutter caused by labeled regions that occur in both a current semantic point cloud and a semantic point cloud image included in a topological node.

19. The method of claim 18, wherein the convolutional neural network includes convolutional layers that output first latent variables to first fully connected neural network layers.

20. The method of claim 12, wherein the variational auto-encoder neural network determines the semantic point cloud image by outputting second latent variables to second fully connected neural network layers.

\* \* \* \* \*